3,170,905
PRODUCTION OF CIS-1,4 POLYBUTADIENE WITH AN ORGANIC COMPLEX COMPOUND OF NICKEL-BORON TRIFLUORIDE ETHERATE-ALUMINUM TRIALKYL CATALYST
Kenichi Ueda, Akira Onishi, Toshio Yoshimoto, Junichi Hosono, and Katsuhiko Maeda, all of Yokohama, Japan, assignors to Bridgestone Tire Company Limited, Tokyo, Japan
No Drawing. Filed Dec. 28, 1960, Ser. No. 78,806
Claims priority, application Japan, Dec. 31, 1959, 34/41,517; Oct. 14, 1960, 35/41,224
7 Claims. (Cl. 260—94.3)

This invention relates to a process for the conversion of butadiene to a solid butadiene polymer having a high content of cis-1,4 configuration by contact with a catalyst system consisting of (A) an organic complex compound of nickel, (B) boron trifluoride etherate and (C) an organometallic compound of aluminum.

One object of our invention is to provide a novel and highly useful catalyst system for the preparation of a solid butadiene polymer having a high content of cis-1,4 configuration from butadiene. Another object is to provide a relatively low temperature, low pressure process for the polymerization of butadiene in substantial yields to form a solid butadiene polymer having a high content of cis-1,4 configuration.

There are three known methods for manufacturing polybutadiene having a high content of cis-1,4 configuration as follows:

(1) Phillips Process, which is a polymerization process using catalysts consisting of trialkyl aluminum and titanium tetraiodide.

(2) Hüls Process, which is a polymerization process using catalysts consisting of triisobutylaluminum and titanium tetrabromide.

(3) Montecatini Process, which is a polymerization process using catalysts consisting of dialkylaluminumchloride and cobaltous chloride or the like.

The catalyst system to be used for the method of this invention consists of a combination of three kinds of components A, B and C, of which the A component is a compound selected from the group consisting of organic complex compounds of nickel, the B component is boron trifluoride etherate, and the C component is a substance selected from the group consisting of organometallic compounds of aluminum.

The advantageous features of this invention compared with the above mentioned three known methods are as follows:

(1) The cis content of polybutadiene produced by the method of this invention is higher than that of polybutadiene produced by any other known methods. In the first or second known method described previously, the cis content is at most 94 or 85% respectively. A little higher cis content is obtained by the third known method, but the cis content decreases considerably as the polymerization temperature becomes higher. According to the method of this invention, cis-1,4 content of about 97% or more is obtained over broad range of polymerization temperatures.

(2) The catalysts of this invention have considerably high activity. For instance, the polymerization can be accomplished in 10 to 20 minutes even with a very small quantity of the catalyst. In general, with a catalyst having a considerably high activity the reaction system generates the heat of reaction rapidly and forms gel or reduces cis-1,4 content, but the catalysts of this invention do not yield gel and do not reduce the cis-1,4 content. It is considered to be one of the causes of such high catalytic activity that the catalyst is dissolved or dispersed in the form of fine particles.

(3) The catalyst soluble in organic solvents, such as hydrocarbons or alcohols, can be manufactured by suitably selecting the conditions of manufacturing the catalysts.

(4) The molecular weight can be regulated by changing the preparation conditions of the catalyst.

(5) After polymerization, the catalyst can be readily separated from the polymer by washing with alcohol, but the separation may be omitted because the catalyst is usually used in small quantities and harmless after being made inactive with alcohol, alcohol-ketone or the like.

Belgian Patent No. 573,860 discloses a method of manufacturing cis-polybutadiene with a catalyst consisting of two components: chlorides or inorganic salts of the metals of group VIII of the Periodic Table and an organometallic compounds.

The catalyst of this invention is essentially different from the above described catalyst and belongs to another class of catalyst. The main differences are as follows:

(1) The catalyst of this invention is not a simple mixture of a boron trifluoride etherate and a two component catalyst system which is active in itself such as Montecatini catalyst, but all three components of the catalyst of this invention are indispensable to display the catalytic function, that is, two components alone generally have no activity for polymerization or cis-orientation.

(2) One component of the catalyst of this invention is selected from the organic complex compounds of nickel. Said complex compounds were found unexpectedly to be very suitable for one component of the catalyst of this invention, and the use of those compounds for the catalyst of cis-1,4 polymerization of butadiene is not known at present.

(3) According to the above Belgian patent the cis content is reduced considerably when the polymerization temperature is raised, but with the catalyst of this invention the cis content is not so much effected by the polymerization temperature.

In U.S. Patent No. 2,922,782, there is described a new catalyst system for polymerization of ethylene consisting of (1) a compound of a metal of group IV, V or VI of the Periodic Table, (2) an organoaluminum compound and (3) a boron halide, thereby using the boron halide to reduce the molecular weight of the polymer compared with that obtained when the boron halide is omitted. Though such catalyst systems seem to be somewhat similar to those of the method of this invention, it relates to a catalyst for polymerization of monoolefin. To find a suitable catalyst for manufacturing cis-1,4 polybutadiene, application of the present knowledge or ordinary or even stereospecific catalyst for polymerization of monoolefin is almost useless because monoolefin cannot polymerize in the form of 1,4 addition.

The U.S. patent uses the compounds of the metals belonging to groups IV, V and VI of the Periodic Table, and on the contrary, the catalyst system of this invention comprises the compounds of nickel, belonging to group VIII so that the catalyst of this invention is different from those of the U.S. Patent. Further, more essential difference is that in the catalyst of the U.S. patent boron halides are added as an auxiliary catalyst to the catalyst which can polymerize olefin in substantial yield in itself, in order to change the activity and also to reduce the molecular weight. On the contrary, combination of the organic complex compounds of the catalyst system of this invention and organometallic compounds of aluminum, namely trialkyl aluminum, cannot produce a catalyst having substantial activity for the polymerization of butadiene and yielding high molecular weight polymer, but the catalytic activity is afforded to the catalyst and polymers of high molecular weight are obtained by adding boron trifluoride etherate as an indispensable component, thus the catalysts of this invention are essentially different from the former catalyst system and belongs to different kinds.

Briefly, the process of this invention comprises the conversion of butadiene in substantial yields to solid polymers having a high content of cis-1,4 configuration, by contacting butadiene with a catalyst system consisting of three components: (A) a compound selected from the group consisting of the organic complex compounds of nickel such as acetoacetic ester nickel and nickel tetracarbonyl; (B) boron trifluoride etherate; (C) a substance selected from the group consisting of organometallic compounds of aluminum such as triethylaluminum. We prefer to use the compounds which are described above as examples because they are commercially available and relatively cheap, and also they give highly cis-orientating efficient catalysts.

The catalyst system is generally prepared by mixing three components in an inert atmosphere in a suitable diluent. If necessary to modify the catalytic function of said catalyst system, aging or heat-treating of the system may be carried out after prepared.

The contacting of butadiene with a catalyst system is effected at temperature within the range of about $-30°$ C. to about 150° C., preferably about 0° C. to about 80° C., in liquid phase, under a pressure sufficient to maintain the reaction system in liquid phase and under an inert atmosphere.

It is desirable to use a suitable diluent which serves both as a reaction medium and a solvent for the solid reaction products, and benzene is generally used for this purpose. In some cases, however, non-solvents or poor solvents may be used successfully for effecting suspension polymerization because some of the catalysts of this invention are suitable for the process, pentane, diisopropyl ether etc. are generally used for this purpose.

Polymerization can be also carried out without any diluent because the excess monomer acts as diluent.

Polymerization is effected by using butadiene, substantially free of catalyst poisons or polymerization inhibitors, but saturated hydrocarbons are substantially harmless to polymerization.

The polymers of butadiene prepared by the method of this invention are usually rubbery solids having intrinsic viscosities of about 0.4 to about 5.0. The polymers also have high contents of cis-1,4 configuration of usually 90 to 97% and under suitable conditions more than 97%. In this invention, microstructures were determined according to the infrared spectroscopic analysis proposed by Morero (La Chimica e L'Industria, 41, 758 (1959)). Intrinsic viscosities were determined in toluene solution at 25° C. Gel contents of these polymers are measured by filtering their solution in benzene with 200 mesh wire gauze while they were substantially zero in the polymers obtained by using the catalyst system containing boron trifluoride etherate as a B component.

The A component of the catalyst of this invention are organic complex compounds of nickel and they are as follows: nickel tetracarbonyl, hydroxyaldehyde complex compounds such as salicylaldehyde nickel, and salicylaldehydeimine nickel; hydroxyketone complex compounds such as acetylacetone nickel, and derivatives thereof; and hydroxyester complex compounds such as acetoacetic ethyl ester nickel, and derivatives thereof. We prefer to use a compound selected from the group consisting of acetoacetic ester nickel, nickel tetracarbonyl, salicylaldehyde nickel, salicylaldehydeimine nickel, acetylacetone nickel, because they afford efficient and high cis orientating catalysts. The suitable organic complex compounds seem to have carbon, nitrogen and/or oxygen atom directly attached to the metal in the molecule.

The B component of the catalyst used for the method of this invention is boron trifluoride etherate because it forms the catalyst which provides high molecular weight polybutadiene having high content of cis-1,4 configuration usually containing no gel in substantial yields.

The C component of the catalyst to be used for the method of this invention is a trialkyl aluminum compound for instance triethylaluminum, tributylaluminum and triisobutylaluminum.

By selecting each component from the preferable compounds above mentioned and combining them, preferable three component catalysts can be obtained such as: acetoacetic ethyl ester nickel-boron trifluoro etherate-triethylaluminum or triisobutylaluminum, nickel tetracarbonyl-boron trifluoride etherate-triethylaluminum or triisobutylaluminum, salicylaldehyde nickel - boron trifluoride etherate-triethylaluminum or triisobutylaluminum, salicylaldehydeimine nickel-boron trifluoride etherate-triethylaluminum or triisobutylaluminum, and acetylacetone nickel-boron trifluoride etherate-triethylaluminum or triisobutylaluminum.

When the three component catalysts are prepared by mixing the A, B and C components the mixture ratio, concentrations and mixing temperature of these components and other various factors have influence on the catalytic activity. Among these conditions, the mixture ratio is the most important factor. The mole ratio of the C component to the B component is usually within the range of about 0.1 to about 5.0 for a definite A component.

The preferable mole ratio of the C component to the B component is a little varied by the kind and amount of the A component or the kind of the B component, but it is generally within the range of about 0.4 to about 1.2.

The mole ratio of the A component to the C component is usually within the range of about 0.06 to about 10 for a definite B component. But the preferable mole ratio of the A component to the C component is generally within the range of about 0.1 to about 4.0.

In the case of acetoacetic ester nickel-boron trifluoride etherate-triethylaluminum catalyst, a remarkable change in the activity occurs when a definite organic nickel complex compound is used as the mole ratio of the organometallic compound to boron halide is changed. The mole ratio usually used for the polymerization is 0.1 to 3.0. Moreover, it is preferable to use less than 10 times mole ratio of nickel organo-complex compounds to organometallic compound at a constant mole ratio of the organometallic compound to boron halides.

For instance, when the polymerization is effected by contacting 21 g. of butadiene with the catalyst system consisting of 0.2 g. of acetoacetic ethyl ester nickel as a A component, boron trifluoride etherate as a B component and 2.46 moles of triethylaluminum as a C component, at the polymerization temperature of 40° C. for 1 hour, there is a point of maximum activity at a mole ratio $AlEt_3/BF_3$ between 0.4 and 1.2, and the polymer containing more than 97% of cis-1,4 configuration can be obtained with a mole ratio between 0.7 and 2.0. This is the example illustrating that the mole ratio of triethylaluminum to boron trifluoride has important influence on the catalytic activity.

Further, by selecting a proper concentration of each component, a suitable mole ratio and the preparation temperature of the catalyst, dispersed corpuscular catalysts or soluble catalysts can be prepared.

This is one of the characteristics of the catalysts of this invention and it is considered that the polymerization activity is high as the catalyst is soluble.

Moreover, one factor usually having considerable influence on the activity of the three component catalyst having activities for cis-1,4 polymerization is the quantity of complex compound of nickel. Moreover, the order of addition of these components is important. The catalyst prepared by adding the three components in the order of A, B and C shows more activity for the cis-1,4 orientation than the catalyst prepared by adding the A component to a mixture of the B and C components.

However, a better method of manufacturing the catalysts among the above two methods is to add the C component after the A and B components have been sufficiently reacted.

The three component catalyst can be prepared even at low temperature if each component is reactive or soluble in a suitable solvent. Catalytic activity is not so much influenced by the small variations of the catalyst preparation or polymerization temperature, but it is preferable to employ a low catalyst preparation temperature in order to obtain high catalytic activity and high molecular weight polymer.

As the catalyst preparation temperature becomes higher, the catalytic activity decreases and the gel content of the obtained polymer increases.

The catalyst system is prepared by admixing said three components in an anhydrous liquid hydrocarbon diluent generally at a temperature between about −50° C. and about 80° C., preferably about −5° C. and about 40° C.

When the catalysts of this invention are stored at room temperature, the activity does not decrease so markedly as Ziegler catalyst. When the catalysts are stored at −50° C., the activity does not change for a few hours. The molecular weight of the polymer obtained depends on the kind of the B component. Boron trifluoride etherate is the most preferable among the B component to obtain the high molecular weight polymer. The cis-1,4 contents of butadiene polymers do not vary so much over a wide range of variations of the catalyst preparation but of course, large excess of the B and C components tends to decrease the cis-1,4 contents of the polymers. The fact shows that the catalyst of this invention is essentially different from the known catalysts.

The ratio of the amount of the catalyst to that of butadiene is not specially limited in this invention. In the representative catalyst systems only 1 mmole of the C component against 1 mole of the monomer is sufficient to produce polybutadiene in substantial yield.

It is desirable to minimize the introduction of water, oxygen, alcohol and acid into contact with the catalyst, but the effect of these materials on the polymerization activity and cis-1,4 orientating activity of the catalyst system is not so sensitive as that of Ziegler-type catalyst.

Diluent is generally used to control the polymerization easily. The ratio of the amount of diluent to that of the monomer is not so critical, but usually it is within 40 by volume.

The diluents and solvents of the catalyst are aromatic hydrocarbons such as benzene, toluene, a xylene and analogous substances thereto; aliphatic hydrocarbons such as propane, butane, pentane, hexane, heptane, benzine, and similar substances thereto; alicyclic hydrocarbons such as cyclohexane, decalin and similar substances thereto; hydrogenated aromatic hydrocarbons such as tetraline and similar substances thereto and diisopropyl ether.

Aromatic hydrocarbons such as benzene, toluene, xylenes are preferable for solution polymerization process. Pentane, butane, diisopropylether and the like are preferable for suspension polymerization process.

Solvents or diluents should be substantially free of catalyst poisons or polymerization inhibitors such as oxygen, water, alcohol and the like to effect polymerization efficiently.

Purification of solvents can be carried out by generally known methods.

After the completion of polymerization the elimination of catalyst can be done by a following simple manner which is a characteristic of the present catalyst.

After the reaction, if necessary, a solvent containing a few percent of phenyl-β-naphthylamine is added to dissolve the polymer completely or to lower the viscosity of the reaction mixture and the mixture is poured into a large quantity of non-solvent, such as methanol, isopropyl alcohol, or methanol acetone to precipitate the polymer. For instance, the polymer prepared with the three component catalyst consisting of acetoacetic ethyl ester nickel, boron trifluoride etherate and triethylaluminum has dark color because of the remained catalyst but it changes to a colorless polymer gradually by washing it several times with methanol.

The polymer obtained with the three component catalyst consisting of nickel carbonyl, boron trifluoride and triethylaluminum is colorless already when it is precipitated with a non-solvent.

By refining the polymer in this manner only, ash content in the polymer is 0.3 to 0.6%. If necessary, by sheeting or cutting the polymer the washing effect is further increased.

Moreover, ash content can easily be reduced by acid treatment (with methanol-hydrogen chloride or hydrogen chloride). By treating the polymer (ash content: about 0.6%) which is polymerized with the three component catalyst consisting of nickel carbonyl, boron trifluoride and triethylaluminum with methanol-hydrogen chloride or hydrogen chloride its ash content will be reduced to 0.03%.

In the present catalyst, each of the components A, B and C has important indispensable function. Two component catalyst systems consisting of A and B or A and C components such as acetoacetic ester nickel-boron trifluoride etherate, acetoacetic ester nickel-triethylaluminum, nickel tetracarbonyl-triethylaluminum do not provide any high polymer or substantially all cis-1,4 polybutadiene. On the contrary, the three component catalyst systems of this invention provide selectively solid cis-1,4 polybutadiene. From this fact it can be clearly recognized that any of the three components is indispensable.

This fact proves that the present method is essentially different from the heretofore known methods of synthesis of cis-polybutadiene.

The mechanism of cis-1,4 polymerization with the catalyst of this invention is not yet perfectly clear, but it is certain that each of the A, B and C components takes part jointly of the synthesis of cis-polybutadiene and it seems that each of the components has special main function, i.e., the A component mainly serves to the cis-1,4 orientation of butadiene and the B component serves to increase the molecular weight of cis-1,4 polybutadiene, while the C component effects together with the B component mainly to provide catalytic activity.

Moreover, the catalyst of this invention shows high activity and reproducibility when each of the components A, B and C is soluble and also by suitably selecting the mixture ratio of the components a catalyst of colloidal state or soluble state can be produced and particularly when the catalyst is prepared with a low concentration of the components A, B and C the catalyst is in almost soluble state as seen by naked eyes. Therefore, the catalyst of this invention has high activity and are effective with a very small quantity to the synthesis of cis-1,4 polybutadiene, which is the remarkable advantage and more particularly, the soluble catalyst can be dissolved in a non-solvent of polymers, such as, alcohol, acetone and the like so that the separation of the catalyst from the polymer can be made very easily. When pure polymer is not necessary it can be used without specially eliminating the catalyst as its content is very small.

Following examples illustrate the present invention but not limitative.

*Example 1*

The following experiments show the results of polymerization with the binary catalyst consisting of triethylaluminum-acetoacetic ethyl ester nickel. With the above catalysts no polymerization occur. The condition of polymerization and results are shown in the following:

Polymerization time _____ hours __ 17
Polymerization temperature _____ ° C __ 40
Butadiene _____ g __ 20

Example 2

0.2 g. of anhydrous acetoacetic ethyl ester nickel was put in a pressure bottle and dissolved in 30 ml. of anhydrous benzene.

To the resulting solution, while stirring with a magnetic stirrer, was added dropwise a solution of 3.51 mmoles of boron trifuloride etherate in 10 ml. of anhydrous benzene and after the addition, the agitation was continued for 5 to 10 minutes to sufficiently react acetoacetic ethyl ester nickel and boron trifluoride etherate, and then a solution of 2.46 mmoles of triethylaluminum in 10 ml. of anhydrous benzene was added to it dropwise. It took about 20 minutes to prepare the catalyst. The catalyst thus prepared was cooled to −70° C. with Dry Ice-methanol and 21 g. of liquefied butadiene was added under a reduced pressure and polymerization was effected with stirring at 40° C. for 60 minutes. After the compleiton of the polymerization reaction, unreacted butadiene was expelled and the solution was diluted with benzene mixed with an antioxidant. The resulting solution was put in methanol to precipitate the polymer. Solids were washed several times with methanol to remove the catalyst and dried under reduced pressure to give 19.8 g. of rubbery polymer having an intrinsic viscosity of 1.6 and a microstructure; cis-1,4, 98.3%; trans-1,4, 1.4%; vinyl, 0.3%.

By changing the amount of boron trifluoride etherate, a series of results were obtained as shown in the following:

| Test No. | Triethyl-aluminum (mmoles) | AlEt₃/BF₃ mole ratio | Yield of polymer (g.) | Microstructure (percent) | | | $[\eta]$ |
|---|---|---|---|---|---|---|---|
| | | | | cis | trans | Vinyl | |
| 2 | 2.46 | 0.2 | 5.7 | 94.8 | 4.6 | 0.6 | 1.5 |
| 3 | 2.46 | 0.4 | 5.3 | 96.5 | 2.8 | 0.7 | |
| 4 | 2.46 | 0.8 | 17.4 | 98.5 | 1.2 | 0.3 | |
| 5 | 2.46 | 0.9 | 15.5 | 98.8 | 1.0 | 0.2 | 2.4 |
| 6 | 2.46 | 1.2 | 15.9 | 99.1 | 0.7 | 0.2 | 3.3 |
| 7 | 2.46 | 1.5 | 2.0 | 98.7 | 1.1 | 0.2 | 3.5 |
| 8 | 2.46 | 3.0 | trace | | | | |
| 9 [1] | 2.46 | | 0 | | | | |
| 10 [1] | 5.00 | | 0 | | | | |

[1] Boron trifluoride etherate was not used.

Example 3

An aqueous solution of nickel acetate was added to alcoholic solution of salicylaldehyde.

A green precipitate obtained was washed several times with water and then methanol, and dried under a reduced pressure. 0.2 g. of the anhydrous salicylaldehyde nickel thus obtained, 2.73 mmoles of boron trifluoride etherate, and 2.46 mmoles of triethylaluminum were used as the A, B and C components respectively to prepare catalyst. Catalyst preparation and polymerization were carried out according to the similar method as described in Example 2 except that the polymerization was effected for 80 minutes. Polymer weighed 15.8 g. Microstructure: cis-1,4, 94.7%; trans-1,4, 3.7%; vinyl, 1.6%.

Example 4

To an alcoholic solution of salicylaldehyde was added aqua ammonia and an aqueous solution of nickel acetate in this order. A precipitate was dried. Salicylaldehyde-imine nickel thus obtained, boron trifluoride etherate and triethylaluminum were used to prepare catalyst as the A, B and C components respectively. Catalyst preparation and polymerization were carried out according to the similar method as described in Example 2.

The results are as follows:

Triethylaluminum _____ mmoles __ 4.00
AlEt₃/BF₃ _____ mole ratio __ 0.9
Reaction time _____ minutes __ 90

| Test No. | Salicyl aldehy-deimine nickel (g.) | Yield of polymer (g.) | Microstructure (percent) | | | $[\eta]$ |
|---|---|---|---|---|---|---|
| | | | cis | trans | Vinyl | |
| 1 | 0.1 | 20.4 | 96.5 | 2.7 | 0.8 | 2.30 |
| 2 | 0.2 | 20.2 | 94.2 | 4.9 | 0.9 | |

Example 5

To a suspension of nickel hydroxide prepared from $NiCl_2 \cdot 6H_2O$ in a small quantity of water was added an equivalent quantity of acetylacetone. The mixture was heated to give bluish green crystals. Crystals were filtered, washed with water, dried under reduced pressure at first at room temperature and then at 100° C. for 2 hours. Green crystals of acetylacetone nickel thus obtained were used as the A component of the catalyst system.

Polymerization was carried out according to the similar method as described in Example 2 except that some modifications were employed as shown in the following: Acetylacetone nickel, 0.2 g.; triethylaluminum, 4.00 mmoles; AlEt₃/BF₃ (mole ratio), 0.9; 20.4 g. of a rubbery polymer was obtained, intrinsic viscosity 1.3, microstructure: cis-1,4, 94.8%; trans-1,4, 4.4%; vinyl, 0.8%.

Example 6

2.5 mmoles of nickel carbonyl, 1.14 mmoles of boron trifluoride etherate, 2.0 mmoles of triethylaluminum and anhydrous benzene were added in this order into a pressure bottle in a dry nitrogen atmosphere up to a total volume of 50 ml. Then, the bottle was sealed, allowed to stand at room temperature for about 40 minutes, after which it was cooled with Dry Ice-methanol to about −50° C., and 13.5 g. of liquefied butadiene was added thereto, and the bottle was again sealed.

Polymerization was effected by revolving the bottle for 5 hours in a constant-temperature bath controlled at 18° C. The separation and purification of the polymer were similar to those of Example 2. 9.2 g. of rubbery polymer were obtained which had an intrinsic viscosity of 2.6 and a microstructure: cis-1,4, 95.9%; trans-1,4, 2.9%; vinyl, 1.2%.

Example 7

2.0 mmoles of nickel carbonyl (as a benzene solution of 0.1 mole concentration), 2.0 mmoles of boron trifluoride etherate (as a benzene solution having a concentration of 0.1 mole) and 2.0 mmoles of triethylaluminum (as a benzene solution of 0.1 mole concentration) were added in this order in nitrogen atmosphere to a pressure bottle up to a total volume of 60 ml. After sealed, the bottle was allowed to stand at room temperature for about 1 hour. Then, it was cooled to about −50° C. with Dry Ice-methanol, and 27 g. of liquefied butadiene were added thereto, and the bottle was again sealed. Polymerization was effected by revolving the bottle for 1 hour in a constant-temperature bath controlled at 25° C. to 26° C. The separation and purification of the polymer were similar to those of Example 2.

21.5 g. of a rubbery polymer was obtained which had an intrinsic viscosity of 2.2 and a microstructure: cis-1,4, 96.0%; trans-1,4, 3.4%; vinyl, 0.5%. The polymer contained 0.6 weight percent ash. In the case of another method for purification of the polymer, the polymerization mixture was added with a suitable amount of benzene to form about 3% polymer solution and 280 ml. of the solution was treated with 500 ml. of 0.4% hydrogen chloride solution in methanol for 1 hour. The microstructure of the polymer thus obtained was same as described above. The intrinsic viscosity decreased more or less, but the ash content was considerably reduced to 0.03%.

Example 8

Polymerization was carried out according to Example 2 at 60° C. using three component catalyst consisting of acetic ethyl ester nickel as the A component, boron trifluoride etherate and triethylaluminum as the B and C components, respectively.

The results were as follows:

Polymerization temperature _____ ° C__ 60
Polymerization time _____ hour__ 1.0
Butadiene _____ g__ 21

| Test No. | Acetacetic ethyl ester nickel (g.) | Triethyl-aluminum (mmoles) | Al/BF$_3$ mole ratio | Yield of polymer (g.) | Microstructure (percent) | | |
|---|---|---|---|---|---|---|---|
| | | | | | cis | trans | Vinyl |
| 1 | 0.1 | 2.46 | 0.9 | 20.1 | 89.8 | 9.3 | 0.9 |
| 2 | 0.1 | 1.23 | 0.9 | 7.0 | 95.3 | 4.0 | 0.7 |
| 3 | 0.1 | 2.46 | 1.2 | 18.5 | 96.2 | 3.1 | 0.7 |

What we claim is:

1. A process for the polymerization of butadiene, which comprises polymerizing butadiene in liquid phase at a temperature between about −30° C. and about 150° C., under a pressure sufficient to maintain the reaction system in liquid phase and under an inert atmosphere to a solid polymer having a high content of cis-1,4 configuration and substantially no gel formation by contacting butadiene with a catalyst obtained by mixing at a controlled temperature the three components consisting of (A) a nickel complex selected from the group consisting of tetracarbonyl nickel, hydroxy ester nickel complex, hydroxy ketone nickel complex, and hydroxy aldehyde nickel complex, (B) boron trifluoride etherate, and (C) trialkyl aluminum, the mol ratio of said (A) component to said (C) component being within the range of about 0.1 to about 4.0, and the mol ratio of said (C) component to said (B) component being within the range of about 0.1 to about 5.0.

2. A process according to claim 1 wherein said boron trifluoride etherate is boron trifluoride ethyletherate.

3. A process according to claim 1 wherein said trialkylaluminum is triethylaluminum.

4. A process according to claim 1 wherein said liquid phase includes a hydrocarbon diluent selected from the group consisting of benzene, toluene and a xylene.

5. A process according to claim 1 wherein said hydroxyester nickel complex is acetoacetic ethyl ester nickel.

6. A process according to claim 1 wherein said hydroxyketone nickel complex is acetylacetone nickel.

7. A process according to claim 1 wherein said hydroxyaldehyde nickel complex is selected from the group consisting of salicylaldehyde nickel and salicylaldehyde-imine nickel.

References Cited in the file of this patent

UNITED STATES PATENTS

| | | |
|---|---|---|
| 2,521,022 | Rowland | Sept. 5, 1950 |
| 2,882,264 | Barnes | Apr. 14, 1959 |
| 2,965,627 | Fields et al. | Dec. 20, 1960 |
| 2,953,554 | Miller et al. | Sept. 20, 1960 |
| 2,965,626 | Pilar | Dec. 20, 1960 |
| 2,970,134 | Anderson | Jan. 31, 1961 |
| 3,066,126 | Porter et al. | Nov. 27, 1962 |
| 3,066,127 | Carlson et al. | Nov. 27, 1962 |

FOREIGN PATENTS

| | | |
|---|---|---|
| 578,156 | Belgium | 1959 |
| 580,103 | Belgium | 1959 |
| 849,589 | Great Britain | Sept. 28, 1960 |
| 837,251 | Great Britain | June 9, 1960 |

OTHER REFERENCES

Wheland, G. W.: Advanced Organic Chemistry, 2nd ed., 1949, page 80 relied on.